United States Patent Office 3,129,224
Patented Apr. 14, 1964

3,129,224
ANTIMICROBIAL 3-METHYL-7-AMINODECEPHA-
LOSPORANIC ACID DERIVATIVES
Bruce M. Collins, Philadelphia, Pa., assignor to Smith
Kline & French Laboratories, Philadelphia, Pa., a corporation of Pennsylvania
No Drawing. Filed Nov. 23, 1962, Ser. No. 239,802
7 Claims. (Cl. 260—243)

The invention described herein is concerned with organic compounds which are useful as antimicrobial agents in therapeutic applications. These compounds may be represented by the following structural formula:

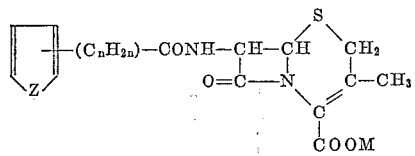

wherein Z is a divalent oxygen or divalent sulfur atom, M is hydrogen or a pharmaceutically acceptable nontoxic cation and $n$ has the value 0, 1, 2 or 3.

The compounds are prepared by treating 3-methyl-7-aminodecephalosporanic acid:

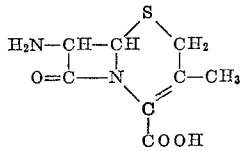

or a salt thereof with an acid chloride, acid bromide or ethoxyformic ester of an acid having the structure:

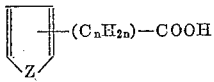

The preferred reaction utilizing the appropriate acid chloride is advantageously executed in a water miscible organic solvent as for example acetone and the product isolated by standard techniques after a short reaction period.

The compound 7-aminodecephalosporanic acid is prepared by catalytic reduction of Cephalosporin C followed by hydrolytic removal of the 5-aminoadipoyl side chain. The process and procedure for this transformation is more fully described hereafter.

In addition to the above free acids (wherein M represents hydrogen) are the pharmaceutically acceptable nontoxic salts thereof. Representative of the cationic moiety of these salts are sodium, potassium, calcium, aluminum, and organic amines such as lower alkylamine (e.g. triethylamine), procaine, chloroprocaine, N,N'-dibenzylethylenediamine, N,N'-bis-(dehydroabietyl)-ethylenediamine, N-methyl-1,2-diphenyl-2-hydroxyethylamine and the like. These salts may be prepared by treating a solution of the free acid in an organic solvent such as amyl acetate, ether or the like with the particular base. Alternatively the amine salts may be prepared by treating an aqueous solution of a basic salt, e.g., the sodium salt, of the particular compound with the particular amine as a salt of a weak acid, e.g., as the acetate.

The compounds of this invention and their salts possess antimicrobial activity against various Gram negative and Gram positive microorganisms, including some which heretofore have been resistant to most of the antibiotics of the classic penicillin type. The compound described herein may generally be administered via any of the usual routes, as for example parenterally, topically or orally, in the usual pharmaceutical forms such as tablets, capsules, powders, solutions, suspensions or the like.

The following examples will typify with more particularity the methods for preparing the compounds of this invention but should not be construed as a limitation of the invention.

Example 1

A. Cephalosporin C sodium salt dihydrate (3 g.) is dissolved in water and combined with an aqueous suspension of 8.0 g. of 10% palladium-on-carbon in 250 ml. of water which has been previously saturated with hydrogen. The mixture is then hydrogenated with agitation at one atmosphere pressure for 1 hour.

The catalyst is removed by centrifugation and the supernatant preserved. The catalyst is then extracted with 80% aqueous methanol at pH 8 and these extracts then adjusted to pH 6 by addition of hydrochloric acid. The extract is evaporated to a small volume and added to the original reaction solution. The combined solutions are then adjusted to pH 6 with aqueous sodium hydroxide and lyophilized to yield 3-methyl-7-(5-amino-N'-adipamyl)-decephalosporanic acid as the sodium salt.

B. Thirty-five grams of 3-methyl-7-(5-amino-N'-adipamyl)-decephalosporanic acid are dissolved in 150 ml. of 98% formic acid. The solution is dried over magnesium sulfate and filtered through the Celite. The residue is then washed with 20 ml. of formic acid and the combined filtrate and wash liquids cooled with agitation in an ice bath. A cold solution of 11.1 g. of nitrosyl chloride in 100 ml. of formic acid at 98% is then added over a 2 minute period and the mixture then agitated with cooling for an additional 3 minutes. At the end of this time, the mixture is evaporated to a thick slurry in rotary evaporator at a room temperature under reduced pressure. The slurry is next dissolved in 150 ml. of water. This solution is cooled in an ice bath and concentrated ammonia is added dropwise with agitation until a pH of 3.5 is reacted. The solid which forms is allowed to stand in the solution in an ice bath for 30 minutes and then collected by filtration. The solid thus collected is washed twice with small portions of cold water and twice with cold acetone. The product is then dried to yield 3-methyl-7-aminodecephalosporanic acid.

Example 2

A. α-Thienylacetic acid (2.84 g., 0.02 mole) is allowed to react overnight with 11 ml. of thionyl chloride at room temperature. The resulting solution is evaporated in vacuo at 35° C. and to the oil so obtained is added 25 ml. of benzene and the mixture re-evaporated below 35° C. An additional 25 ml. of benzene are added and evaporation is repeated. The residual oil comprising α-thienylacetyl chloride is held under vacuum to remove any traces of thionyl chloride.

B. Two grams of α-thienylacetyl chloride are dissolved in 25 ml. of acetone and added slowly with stirring to 2.16 g. of 3-methyl-7-aminodecephalosporanic acid in 90 ml. of 3% aqueous sodium bicarbonate and 50 ml. of acetone. The mixture is allowed to attain room temperature after addition is complete and stirred for approximately 30 minutes. The mixture is next washed three times with 30 ml. portions of ether and then adjusted to pH 2.5 by the addition of concentrated sulfuric acid, maintain a temperature below 10° during this operation. The solution is then extracted with one 25 ml. portion and two 10 ml. portions of butyl acetate. These combined extracts are washed once with water after which 25 ml. of water are added. Solid potassium bicarbonate is added with agitation until the pH is 8. The aqueous layer is then separated, filtered and adjusted to pH 2 by addition below 10° of concentrated sulfuric acid. This acidic mixture is then extracted twice with 20 ml. portions of butyl acetate and dried over sodium sulfate.

There is next added with vigorous stirring a solution of potassium hydroxide in n-butanol (40 g./l.) until the pH is 8.4. The mixture is cooled until solidification occurs and the solid so formed collected by centrifugation, washed with a small amount of acetone and dried. The solid is then dissolved in a minimal amount of 9:1 acetone-water solution and precipitated by the addition of anhydrous ether. This solid is then collected and thoroughly dried in vacuo to yield 3-methyl-7-(α-thienylacetamido)-decephalosporanic acid as the potassium salt.

This material is dissolved in water and the pH adjusted to 2. The mixture is then thoroughly extracted with ether and these ethereal extracts washed well with water and dried over sodium sulfate. Evaporation of the solvent then yields 3-methyl-7-(α-thienylacetamido)-decephalosporanic acid as the free acid.

*Example 3*

The following acids are substituted for α-thienylacetic acid in the procedure of Example 2.

| Compound: | Quantity, grams |
|---|---|
| (a) β-Thienylacetic acid | 2.84 |
| (b) α-Thienylcarboxylic acid | 2.56 |
| (c) β-Thienylcarboxylic acid | 2.56 |
| (d) α-Furylcarboxylic acid | 2.24 |
| (e) β-Furylcarboxylic acid | 2.24 |
| (f) α-Furylacetic acid | 2.52 |
| (g) β-Furylacetic acid | 2.52 |
| (h) 2-(β-thienyl)-propionic acid | 3.12 |
| (i) 3-(α-furyl)-propionic acid | 2.80 |

The resultant acid chlorides of the above acids are employed to acylate 3-methyl-7-aminodecephalosporanic acid as described in part B of Example 2.

There is thus respectively obtained:

(a) 3 - methyl-7-(β-thienylacetamido)-decephalosporanic acid
(b) 3 - methyl - 7 - (α-thienylcarboxyamido)-decephalosporanic acid
(c) 3 - methyl - 7 - (β-thienylcarboxyamido)-decephalosporanic acid
(d) 3 - methyl - 7 - (α-furylcarboxyamido)-decephalosporanic acid
(e) 3 - methyl - 7 - (β-furylcarboxyamido)-decephalosporanic acid
(f) 3 - methyl-7-(α-furylacetamido) - decephalosporanic acid
(g) 3 - methyl-7-(β-furylacetamido) - decephalosporanic acid
(h) 3-methyl-7-[2-(β-thienyl)-propionamido]-decephalosporanic acid
(i) 3 - methyl-7-[3-(α-furyl)-propionamido]-decephalosporanic acid.

*Example 4*

One gram of 3-methyl-7-(α-thienylacetamido)-decephalosporanic acid is dissolved in amyl acetate and to the solution is added 10 g. of triethylamine. The solution is stirred for 30 minutes and the solid which forms upon standing collected by filtration and dried to yield the triethylamine salt of 3 - methyl - 7 - (α-thienylacetamido)-decephalosporanic acid.

*Example 5*

One gram of 3-methyl-7-(β-thienylacetamido)-decephalosporanic acid as the potassium salt is dissolved in water at room temperature and 10 ml. of a 10% aqueous solution of N,N'-dibenzylethylenediamine acetate is added. The mixture is stirred, allowed to stand for one hour and then cooled. The solid which forms is collected by filtration and dried to yield the N,N'-dibenzylethylenediamine salt of 3-methyl-7-(β-thienylacetamido)-decephalosporanic acid.

What is claimed is:

1. Compounds of the structure:

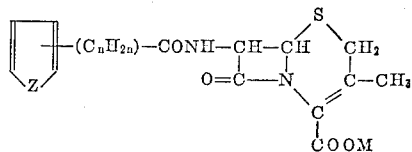

wherein

Z is a member selected from the group consisting of a divalent sulfur atom and divalent oxygen atom.
M is a cation form of a member selected from the group consisting of hydrogen, sodium, potassium, calcium, aluminum, N,N'-dibenzylethylenediamine, N,N'-bis-(dehydroabietyl)-ethylenediamine and N-methyl-1,2-diphenyl-2-hydroxyethylamine, and
n is an integer from 0 to 3 inclusively.

2. Compounds of the formula:

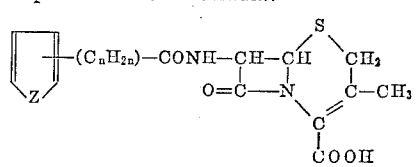

wherein n is an integer from 0 to 3 inclusively.

3. Compounds of the formula:

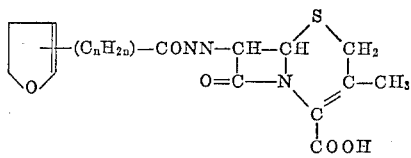

wherein n is an integer from 0 to 3 inclusively.

4. 3 - methyl - 7 - (α - thienylacetamido) - decephalosporanic acid.

5. 3 - methyl - 7 - (β - thienylacetamido) - decephalosporanic acid.

6. 3 - methyl-7-(α-furylacetamido)-decephalosporanic acid.

7. 3 - methyl-7-(β-furylacetamido)-decephalosporanic acid.

References Cited in the file of this patent

UNITED STATES PATENTS

| 2,951,839 | Doyle et al. | Sept. 6, 1960 |
| 2,996,501 | Doyle et al. | Aug. 15, 1961 |

UNITED STATES PATENT OFFICE
CERTIFICATE OF CORRECTION

Patent No. 3,129,224                     April 14, 1964

Bruce M. Collins

It is hereby certified that error appears in the above numbered patent requiring correction and that the said Letters Patent should read as corrected below.

Column 4, lines 32 to 37, for the left-hand portion of the formula reading

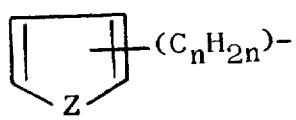     read     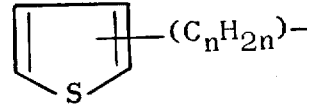

lines 41 to 47, for that portion of the formula reading

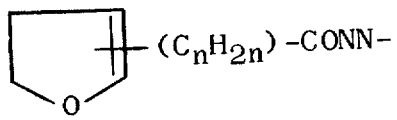     read     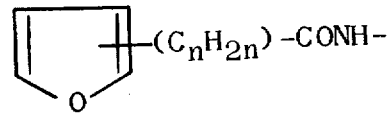

Signed and sealed this 28th day of July 1964.

(SEAL)
Attest:

ESTON G. JOHNSON
Attesting Officer

EDWARD J. BRENNER
Commissioner of Patents